Feb. 8, 1927. 1,616,830

L. SCHULL

ARRANGEMENT FOR DISENGAGING THE FRICTION COUPLING OF ECCENTRIC PRESSES

Filed July 13, 1925

Leopold Schull, Inventor,
By his Attorneys

Patented Feb. 8, 1927.

1,616,830

UNITED STATES PATENT OFFICE.

LEOPOLD SCHULL, OF VIENNA, AUSTRIA.

ARRANGEMENT FOR DISENGAGING THE FRICTION COUPLING OF ECCENTRIC PRESSES.

Application filed July 13, 1925, Serial No. 43,425, and in Austria March 10, 1924.

This invention relates to improvements in arrangements for disengaging the friction-coupling of eccentric presses, presses operated by a crank, shears and the like.

In eccentric presses the coupling between the shaft of the press and the flywheel which is mounted to freely revolve on the said shaft is usually accomplished by the aid of a sleeve, which in some types of couplings is keyed to the shaft of the press and in other types has a part provided with a quick internal screw thread which is connected to a quick screw-thread of the shaft or to a sleeve firmly connected with the latter. By a quick screw-thread I means one which has a high pitch.

In order to disengage such couplings it has been proposed to arrange a pawl rotatable in such a manner, that it can be placed into the path of a projection or nose, provided on the sleeve. When it is necessary to disengage a coupling of this kind, the nose of the sleeve contacts with the pawl with a speed of rotation corresponding to the rapidity of revolution of the press. In the case of fast working presses, this contacting causes a hard and very noisy blow, which is very damaging to the contacting faces of the sleeve-nose and pawl.

The present invention relates to a device, in which the force of the impact is considerably reduced when the coupling is disengaged, whereby a completely noiseless operation is rendered possible.

One embodiment of the present invention, as applied to a friction coupling, is illustrated by way of example on the accompanying sheet of drawings in which—

Figure 1:
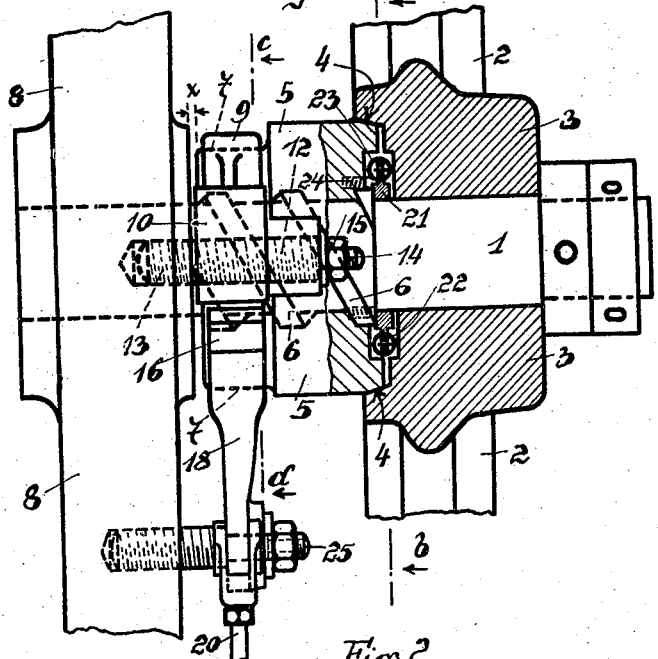

Fig. 1 shows the device in elevation, partly in section.

Figure 2:
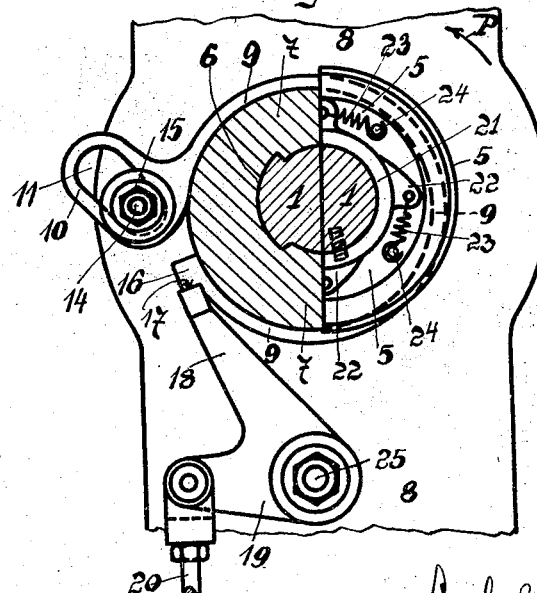

In Fig. 2 the right hand side front view shows the device in section on the line $a$—$b$ of Fig. 1 in the direction of the arrows, while the left hand side view is a sectional front view, the section being taken on line $c$—$d$ of Fig. 1 in the direction of the arrows.

A flywheel 2 is mounted to freely revolve with respect to a shaft 1 of an eccentric press, and a conically shaped clutch face 4 is provided on the boss 3 of the said flywheel. A coupling sleeve 5 is furnished with a correspondingly shaped conical counter-face. A quick screw-thread, provided in the bore of the said sleeve 5, engages a corresponding quick screw-thread 6 on the shaft of the press. The sleeve is provided with a reduced cylindrical extension 7, whose left side is located a small distance $x$ away from the standard 8 of the press. The axis of this cylindrical extension 7 is located eccentrically with respect to the axis of the shaft 1, and this extension 7 is surrounded by a strong steel brake band 9, the left end of which is provided with a slotted extension 10. A bolt 12, screwed at 13 into the standard of the press, passes through the slot 11 of the extension 10, and the right end 14 of this bolt 12 is externally threaded and has a nut 15 connected thereto. The right end of the steel brake band 9 is provided with an enlarged head 16, and this head 16 is provided with a face 17 to contact with the pawl 18. The latter can be moved out of or into the path of the contacting face 17 in any convenient manner, as for example by the foot of the workman operating the press, this being accomplished by means of a lever 19 integral with pawl 18 and a connecting rod 20. The pawl member 18 and the lever member 19 form a single part or element which is pivotally mounted upon the member 25. This member 25 is connected to the standard of the press. In order to urge the sleeve 5 towards the flywheel 3, to cause the engagement of the members of the coupling, a disc 21 is keyed to the shaft 1 and said disc 21 is provided with eyes 22 to which tension-springs 23 are connected. The other end of each spring 23 is connected to a pin 24, firmly screwed into the sleeve 5. The quick thread 6 of the shaft 1 is right-handed, so that the tension-springs 23, urge the sleeve 5 to revolve in the direction of the arrow P (Fig. 2), and thus to move towards the flywheel of the press.

The device operates in the following manner:—

Since the extension 7 is eccentric with respect to the shaft 1, the revolution of the shaft 1 would cause the center of the member 9 to move in a circular path about the axis of the shaft 1, if the member 9 were fixed to the extension 7. However, since the slotted extension 10 can slide with respect to the bolt 12, the combination of these two movements causes the end 16 of the brake band to move through an elliptical path. The length of the minor axis of this ellipse depends upon the eccentricity of the sleeve 7 with respect to the shaft 1. Hence, when the pawl 18 is moved so as to contact with the face 17 of the member 16 the impact is slight with a correspondingly small amount of noise, and the contact between the pawl 18 and the member 16 causes the tightening of the brake band 9 so that it frictionally engages the extension 7. This causes the sleeve 5 to be turned so that the coupling between said sleeve and the flywheel is released. As soon as the engagement between the pawl 18 and the member 16 is interrupted, the tension-springs 23 pull the sleeve towards the flywheel and the coupling is again automatically engaged.

The advantage of the disengagement according to the present invention consists in that the speed by which the member 16 meets the pawl 18 is considerably reduced (according to the chosen eccentricity). To this is to be added, that with respect to the path of the stop 17, the path of the pawl 18 can be arranged in such a manner, that the contact between the stop and pawl takes place at a point of the elliptical path of the stop, in which the latter moves with the smallest speed. By this arrangement a completely noiseless contacting and a considerable reduction of surface-pressure is attainable.

I claim—

1. In a press or the like having a coupling member, the combination of a driving shaft having an external thread thereon, a fly wheel mounted upon said shaft and freely revoluble with respect to said shaft, the adjacent portions of said coupling member and of said fly wheel having corresponding clutch faces adapted to frictionally engage each other, said coupling member having an extension which is eccentric with respect to the said shaft, a flexible brake band surrounding said extension, means adapted to slidably engage one end of the said brake band, and a pawl adapted to engage and stop the movement of the other end of the said brake band.

2. In combination, a shaft, a clutch having two members associated with said shaft, said shaft having an external screw-thread, one of said members having an internal screw-thread associated with the external screw-thread on said shaft, a brake-band associated with said last mentioned member, a pawl associated with said brake-band, means adapted to impart a movement to one end of said brake band to cause said end thereof to have a reciprocatory movement with respect to said pawl, and means adapted to actuate said pawl.

3. In combination, a shaft, a clutch having two members associated with said shaft, said shaft having an external screw-thread, one of said members having an internal screw-thread associated with the external screw-thread on said shaft, a brake band having separated ends and associated with said last mentioned member, a guide associated with one of the ends of said brake band and adapted to slidably guide said brake band, a movable pawl associated with the other end of said brake-band, and means adapted to impart a slidable movement to said brake band so that the last mentioned end thereof has a reciprocating movement with respect to said pawl.

LEOPOLD SCHULL.